United States Patent [19]

Suzuki et al.

[11] Patent Number: 4,621,890
[45] Date of Patent: Nov. 11, 1986

[54] OPTICAL APPARATUS INCLUDING TWO AFOCAL SYSTEMS

[75] Inventors: Akiyoshi Suzuki, Tokyo; Hideki Ina, Yokohama; Kazuo Takahashi, Kawasaki, all of Japan

[73] Assignee: Canon Kabushiki Kaisha, Tokyo, Japan

[21] Appl. No.: 555,526

[22] Filed: Nov. 28, 1983

[30] Foreign Application Priority Data

Dec. 1, 1982 [JP] Japan .................................. 57-210912

[51] Int. Cl.⁴ .............................................. G02B 26/08
[52] U.S. Cl. ...................................... 350/6.1; 350/453
[58] Field of Search .................... 350/6.1, 6.5, 6.6, 6.7, 350/6.8, 6.9, 453, 415; 219/121 LR, 121 LW

[56] References Cited

U.S. PATENT DOCUMENTS

| | | | |
|---|---|---|---|
| 3,771,850 | 11/1973 | Casler | 350/6.91 |
| 4,062,623 | 12/1977 | Suzuki et al. | 350/415 |
| 4,199,217 | 4/1980 | Rogers | 350/6.1 |
| 4,346,990 | 8/1982 | Rhodes | 350/453 |
| 4,427,268 | 1/1984 | Ikemori | 350/453 |

Primary Examiner—John K. Corbin
Assistant Examiner—Vincent J. Lemmo
Attorney, Agent, or Firm—Fitzpatrick, Cella, Harper & Scinto

[57] ABSTRACT

An optical apparatus for imaging light from a laser device into a spot shape includes an objective lens for converting parallel rays into a spot-like light, the pupil plane of the objective lens being located at a position conjugate with the emitting plane of the laser device so that the amount of light at the spot will less be changed under variations of emitting angle in the laser device.

8 Claims, 8 Drawing Figures

OPTICAL APPARATUS INCLUDING TWO AFOCAL SYSTEMS

BACKGROUND OF THE INVENTION

1. Field of the Invention

The present invention relates to an optical apparatus for imaging light from a laser device into a spot shape. Particularly, the present invention relates to an optical apparatus in which the amount of light at the spot will not be changed upon variations of the emitting angle in the laser device.

2. Description of the Prior Art

Recently, lasers are increasingly utilized as essential elements in various instruments such as measuring machines, working machines and so on. The peculiarity of the laser resides in high luminance, monochromatic property and good directivity. It is usual that its own good directivity brings severe requirements for the accuracy of position at which the laser device is set, positional displacement with time and so on. The laser system must meet such requirements. An optical system, for example, an optical system for converging the laser beam may sometimes not be positioned near the laser system. It is general that the platform on which the laser system is placed is interconnected with the optical system through another optical system such as a mirror system or the like. If they are vibrated relative to each other, the apparent emitting angle of the laser beam will vary. It can also be considered that a change in the emitting angle of the laser beam will occur with the passage of time if there is less stability with the oscillation position of the laser.

Referring to FIG. 1, now suppose that a laser system 1 emits parallel rays which are in turn condensed on an object 3 through an optical system 2. The laser system 1 ideally emits a laser beam 10 at its exit end 7 which is parallel to the optical axis. Also suppose that a pin hole 4 having the same diameter as that of the laser beam must be disposed forwardly spaced apart from the optical system 3. If the emitting angle is deviated due to any vibration or change with time of use, the laser beam 11 will be deviated from the pin hole 4 but not condensed on the object 3. In an actual example, the laser system 1 is in the form of 5 mW He-Ne laser and spaced apart from the pin hole 4 by a distance of 1600 mm. If the laser beam of 5 mW is of 0.81 mm diameter and the pin hole is of 0.81 mm diameter, there are obtained 1600 tan $\theta = 0.81$ and $\theta = 1.74$ minutes. Therefore, if the emitting angle is changed only through an angle of about two minutes, no part of the laser beam will pass through the pin hole.

Japanese Patent Publication No. 58736/1982 discloses an optical apparatus which can eliminate the adverse affection of the changed emitting angle of the laser beam. In such an optical apparatus, the exit end of the laser system is disposed at a position conjugate with the surface of a light receiving element so that the position of the light incident on the light receiving element will be maintained constant under variations of the emitting angle in the laser system. However, the laser beam incident on the receiving element is divergent.

SUMMARY OF THE INVENTION

It is an object of the present invention to provide an optical system for imaging a laser beam into a spot shape, the laser beam being less variable with respect to the amount of light at the spot upon variations of the emitting angle thereof.

This object is accomplished by disposing the exit plane of the laser at a position conjugate with the pupil plane of an optical system for imaging parallel rays into a spot shape.

In accordance with the present invention, it is also possible to re-reduce the diameter of a laser beam which would otherwise diverge in the order per m rad. and which will not be ignored with respect to its increased diameter if the laser beam is propagated through an increased distance.

These and other objects, features and advantages of the present invention will become more apparent upon a consideration of the following description of the preferred embodiment of the present invention taken in conjunction with the accompanying drawings.

DESCRIPTION OF THE PREFERRED EMBODIMENTS

Embodiments of the present invention will be described in conjunction with the accompanying drawings.

Figure 2A:
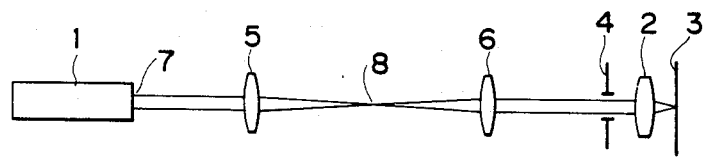
FIGS. 2A and 2B illustrate one embodiment of the present invention, FIG. 2A showing an afocal system and FIG. 2B showing a conjugate relationship between the exit end of a laser and a pin hole.

Referring first to FIG. 2A, an optical system is considered which comprises a laser system 1, a spot imaging objective lens 2, a pin hole 4 located on the pupil plane of the objective lens 2, and two lenses 5 and 6 having the same focal length which is equal to one-fourth of the distance between the laser system 1 and the pin hole 4. The lens 5 is so disposed that the forward focus thereof coincides with the exit end 7 of the laser system 1. The lens 6 is such disposed that the rearward focus thereof coincides with the position of the pin hole 4. In such an arrangement, since the focal length of each of the lenses 5 and 6 is equal to one-fourth of the distance between the laser system 1 and the pin hole 4, the rearward focus of the lens 5 will coincide with the forward focus of the lens 6 at a position 8 intermediate between the laser system 1 and the pin hole 4. These lenses 5 and 6 also provide an afocal converter having one-to-one magnification which is adapted to emit a collimated beam of light when parallel rays are incident on the lenses 5 and 6.

Figure 2B:
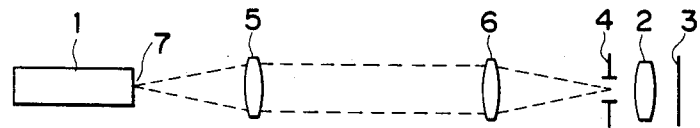
Figure 3:
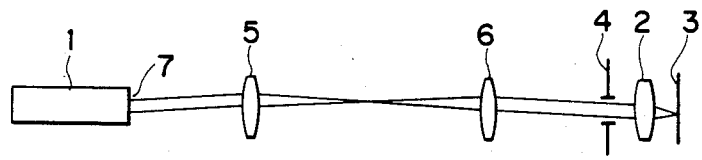
FIG. 3 is a view illustrating the function of the present invention.

As seen from FIG. 2B, the exit end 7 of the laser system 1 is disposed relative to the pin hole 4 in an imaging relationship. Therefore, if the emitting angle of the laser is deviated from its condition parallel to the optical axis as shown in FIG. 3, the laser beam will still be condensed on an object 3 through the optical system 2 via the pin hole 4. It is understood that by the use of such an afocal converter, an adverse affect even due to the vibration not changing the exit position of the laser will be compensated such that the laser beam can be condensed on the object 3 without being shaded by the pin hole 4.

The pin hole 4 may be omitted if it has its diameter equal to that of the pupil of the objective lens 2.

Figure 1:
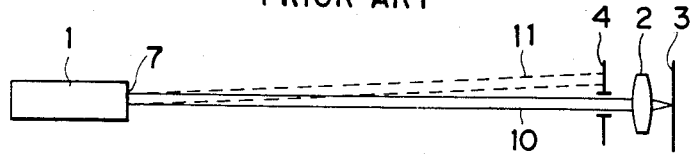
FIG. 1 is a view showing the prior art.

If the present invention is applied to such an arrangement that the laser system and the optical system are moved relative to each other, it is convenient since the exit end of the laser system can be imaged at the other spatial position through the afocal converter. In other words, if the pin hole of the optical system is located near the image of the exit end of the laser system, the laser beam will not adversely be affected by the change in the emitting angle of the laser beam. Even if the optical system is moved, this means, in effect, that the pin hole and laser system are relatively moved toward each other so that the shading by the pin hole is less possible.

Where the reference position of the pin hole coincides with the position of the image, the maximum permissible deviation between the pin hole and the image of the exit end of the laser system formed by the afocal converter is represented as follows:

$$(y-x)/2 \tan \Delta\theta$$

where $\Delta\theta$ is the maximum deviation of the emitting angle of the laser beam; x is the diameter of the laser beam; and y is the diameter of the pin hole. For example, if $x=0.81$ mm, $y=1$ mm and $\Delta\theta=10'$, the maximum permissible deviation is equal to $\pm 32.7$ mm. If the laser beam is directly entered from the laser system to the pin hole without use of any afocal converter as shown in FIG. 1, the value $\Delta\theta$ is multiplied by the distance between the laser system and the pin hole. In this case, it will be required to significantly increase the stability in the emitting angle.

Although the aforementioned embodiment provides the afocal converter composed of two single lenses 5 and 6, each of the single lenses may be replaced by a plurality of lens. Even if so arranged, there can be provided an afocal converter for keeping the exit end of the laser system and the pin hole in a predetermined imaging relationship.

It is also ensured that the laser beam is condensed on the object 3 through an afocal converter other than said afocal converter composed of the optical system which has its focal length equal to one-fourth of the distance between the laser system and the pin hole.

If an afocal converter emitting a laser beam having its diameter of b when a laser beam having its diameter a is incident on the afocal converter is represented by $b/a=\beta$, it will be called "$\beta$-fold afocal converter". It is known that if a laser beam is incident on the afocal converter with an angle of $\Delta\theta$ relative to the optical axis, it emits from the afocal converter with an angle of $\Delta\theta/\beta$.

Although the embodiments shown in FIGS. 2A, 2B and 3 utilize the afocal converter having one-to-one magnification (that is, $\beta=1$) and being composed of the optical systems 5 and 6 having the same focal length, the value $\beta$ is not necessarily limited to one.

Usually, the afocal converter is often used to change the configuration of a propagated laser beam which diverges in the order per m rad. For example, suppose that a ten-fold afocal converter is set in a laser system emitting a laser beam with its divergence of 2 m rad. The laser beam will have its ten-fold diameter and the divergent angle will be equal to 0.2 m rad. Thus, the depth of the laser beam is increased. In the prior art, the setting of the laser beam source was made easier by utilizing the characteristics of the afocal converter by which the diameter of the laser beam is correspondingly increased as well as by which the divergence of propagation angle is decreased so that the deviation relative to the pin hole will relatively be reduced.

In accordance with the present invention which utilizes said afocal converter in addition to the aforementioned imaging relationship between the exit end of the laser system and the pupil plane of the objective lens, the optical system will be conveniently less sensitive to any influence due to the setting error of the laser system and any vibration.

Figure 4:
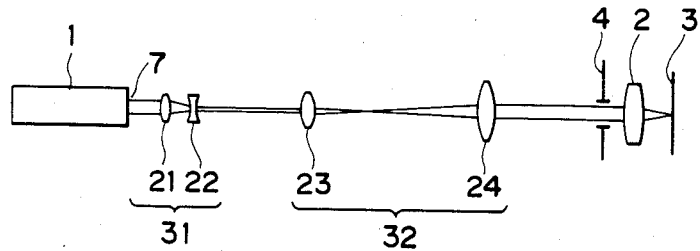
FIG. 4 shows the second embodiment of the present invention.

FIG. 4 shows another embodiment of the present invention in which two $1/\beta$- and $\beta$-fold afocal converters are utilized. The $1/\beta$-fold afocal converter 31 is composed of two optical systems 21 and 22, the rearward focus of the optical system 21 being coincident with the rearward focus of the optical system 22. On the other hand, the $\beta$-fold afocal converter 32 is composed of two optical systems 23 and 24, the rearward focus of the optical system 23 being coincident with the forward focus of the optical system 24. The emitting end of the laser system 1 will be placed in an imaging relationship with the pin hole 4 through these afocal converters 31 and 32. The imaging on the surface of the object will now be described rather than the pin hole.

As the emitting angle of the laser is varied, a spot condensed and formed on the object 3 through the optical system 2 will correspondingly be changed in position. If the angle of the laser beam emitted from the pin hole 4 is equal to $\Delta\theta$ relative to the optical axis and the optical system 2 has its focal length of f, the deviation of the spot condensed on the object 3 through the optical system 2 from the desired position when the laser beam is emitted from the laser system parallel to the optical axis ($\Delta\theta=0$) is generally represented by:

$$f \cdot \tan \Delta\theta (f\Delta\theta \text{ in case of the } f-\theta \text{ lens}).$$

This deviation of the condensed beam cannot be corrected if the change of the emitting angle is caused by the change of the laser system with the passage of time. However, if the emitting angle of the laser is changed to deviate the condensed beam by a difference in oscillation mode between the laser system and the optical system 3, the combination of two afocal converters is effective. In the embodiment shown in FIG. 4, the afocal converter 31 is disposed in a position at which it is subjected to the same vibration as in the laser system 1 while the other afocal converter 32 is located in a position at which it is subjected to the same oscillation as in the optical system 2. As a result, the deviation in the beam imaged on the optical system 2 can be reduced. This will be described below in more detail.

Now, suppose that the value $\beta$ is larger than one and that the exit end 7 of the laser system 1 is placed relative to the pin hole 4 in an imaging relationship through the $1/\beta$- and $\beta$-fold afocal converters 31 and 32. In such a situation, if the laser system 1 is vibrated, the afocal converter 31 is also vibrated in synchronism with the laser system 1. Consequently, the laser beam emitted from the afocal converter 31 is deviated by the value $\Delta\theta$ due to the vibration. In other words, since the laser beam is not changed in its position relative to the afocal converter 31, the beam will not be influenced by the amplification of angle in the afocal converter 31. As a result, the emitted beam will be incident on the $\beta$-fold afocal converter 32 with an angle of $\Delta\theta$ relative to its initial condition. Accordingly, the laser beam has its change of angle equal to $\Delta\theta/\beta$ when it is emitted from the afocal converter 32. This means that the change of angle is reduced by a factor of $1/\beta$ in comparison with the above embodiment shown in FIG. 3. If this laser beam is condensed on the surface of the object through the optical system 2, the deviation of the laser beam from its initial condition will be equal to $f\cdot\tan\Delta\theta/\beta$. This means that the deviation is reduced by a factor of about $1/\beta$.

In the third embodiment of the present invention, an optical system includes three or more lenses only one of which is changed in focal length to maintain the exit end of the laser system at the conjugate relation with the pin hole without change of the afocal converter.

Figure 5:
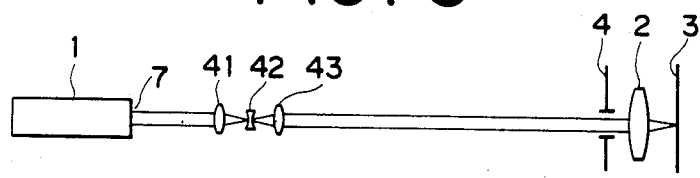
FIG. 5 shows the third embodiment of the present invention.
Figure 6:
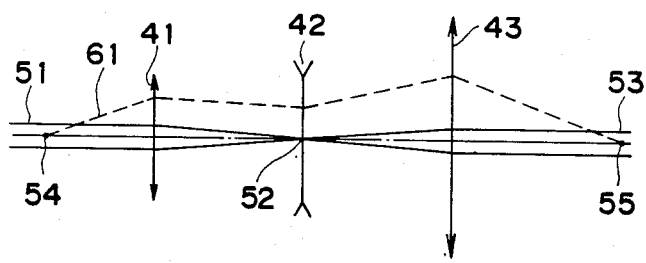
FIG. 6 is a view showing the imaging condition in the third embodiment of the present invention shown in FIG. 5.

As shown in FIG. 5, this optical system comprises a lens 41 having a positive power, a lens 42 having a negative power and a lens 43 having a positive power, for example. The diagrammatic arrangement of the optical system in which all the lenses are thin-walled is shown in FIG. 6. As seen from FIG. 6, the rearward focus of the lens 41 coincides with the forward focus of the lens 43. At this coincidental position is located the lens 42.

Parallel rays incident on the lens 41 is condensed at the rearward focus 52 of the lens 43. The condensed rays will not affected by the power of the lens 42 since they are incident on the lens 42 as a beam having a height of zero. After passed through the lens 42, the beam emits from the lens 43 as parallel rays 53.

On the other hand, the image as shown by a point 54 at the exit end of the laser system spaced away from the lens 41 by a definite distance is influenced by the power of the lens 42 since the beam 61 has a height larger than zero on the passage of the lens 42. Thus, the beam will cross the optical axis at a point 55 corresponding to the power. This means that the positional relationship between the object point 54 and the image point 55 can be changed by varying the focal length of the lens 42 without change of the afocal converter in function. In the illustrated embodiment, the distance between the laser exit end and the pin hole can optionally be set only by changing the focal length of the lens 42, for example, by substituting a zoom lens or an exchangeable lens for the lens 42. Further, if the exit end of the laser system and the pin hole are displaced out of a predetermined optical position, this can be corrected only by changing the focal length of the lens 42.

In the optical system as shown in FIG. 6, suppose that the focal lengths of the lenses 41, 42 and 43 are f41, f42 and f43 and the distances between the lenses 41 and 42 and between the lenses 42 and 43 are d12 and d23, respectively. Now, if the distance between the laser exit end and the pin hole which are to be placed in an imaging relationship relative to each other is 1600 mm as in the previous embodiments; the distance between the laser exit end and the lens 41 is 300 mm; and f41=f43=d12=d23=100 mm, f42 will substantially be −8.3 mm. If f41=f43=d12=d23=500 mm, f42 will substantially be 625 mm.

In the above example, the distance between the lens 43 and the pin hole is represented by:

$$1600-300-100-100=1100 \text{ mm}$$

in the case of f41=f43=d12=d23=100 mm. However, if this distance becomes 900 mm or 1400 mm, the laser exit end and the pin hole can be placed in the imaging relationship relative to each other by causing the focal length of the lens 42 to be equal to −10 mm or −5 mm.

In this embodiment, if f41 and f43 are decreased, a compact correction optical system having its entire reduced length can be obtained. If the lens 42 is thick-walled, the focal length thereof will be changed to vary the principal point of the lens 42 so that the entire length of the afocal converter will somewhat be changed. However, this change is very small in comparison with the distance between the laser exit end and the pin hole. Thus, the change in the entire length of the afocal converter can be ignored.

Although the above embodiments have been described as the pin hole opposed to the laser exit end, it is to be understood that the same advantage can be obtained even by substituting the pupil of the optical system 2 for this pin hole. In other words, it can be considered that the pupil of the optical system 2 is formed by the above pin hole.

Figure 7:
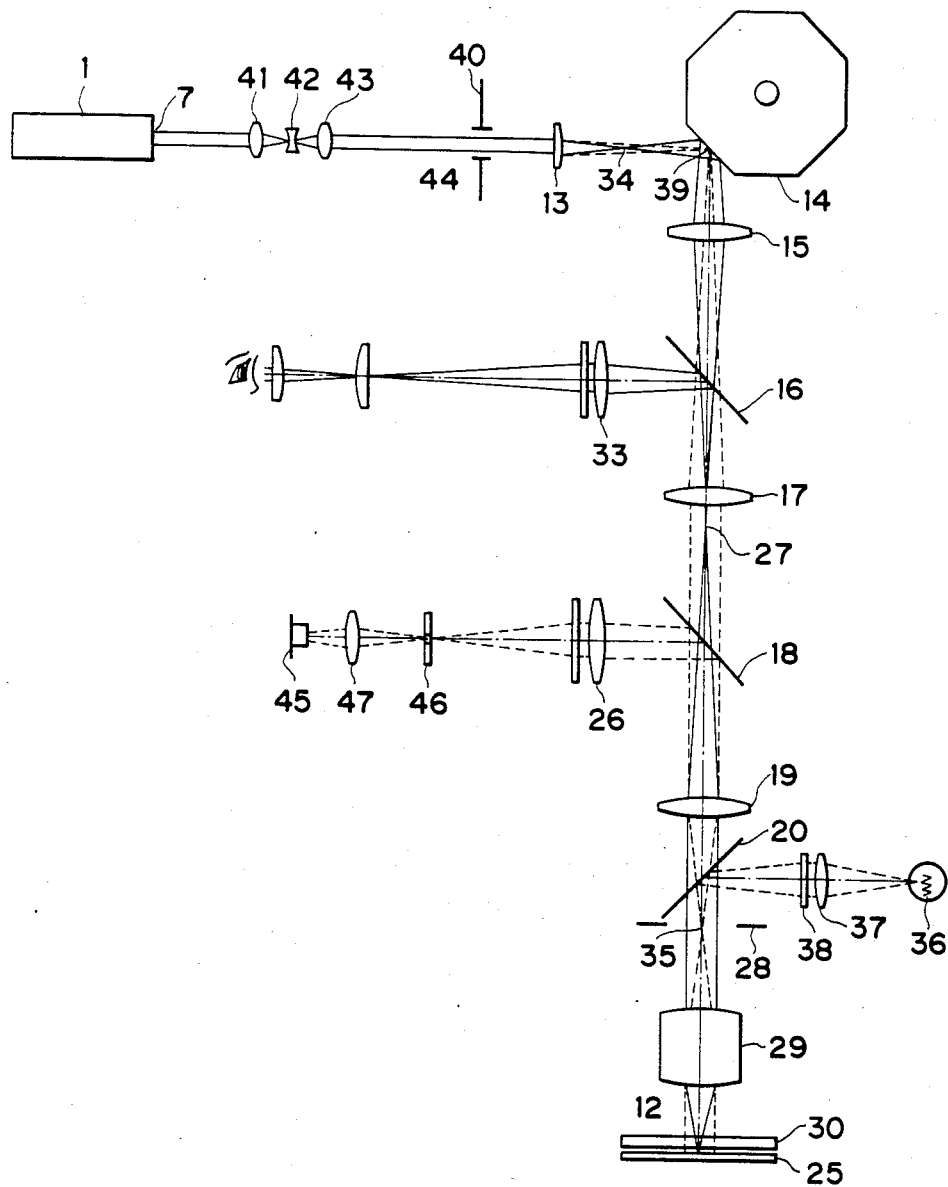
FIG. 7 is a view showing an example in which the final optical system according to the present invention is applied to be a laser scanning optical system in a semiconductor producing apparatus.

It is apparent that the condenser optical system according to the present invention is not limited to the final optical system, but can also be used as an intermediate optical system. FIG. 7 shows the condenser optical system of the present invention which is applied to a semiconductor producing apparatus as a laser scanning optical system.

The laser scanning optical system shown in FIG. 7 comprises a laser system 1, a condenser lens 13, a rotary polygonal mirror 14, a relay lens 15, a beam splitter 16 for conducting the laser beam to a visual observation optical system denoted by 33 and subsequent numerals, a field lens 17, a beam splitter 18 for conducting the laser beam to a photoelectric detection optical system designated by 26 and subsequent numerals, a relay lens 19, a beam splitter 20 for conducting the laser beam to a visual observation optical system denoted by 36 through 38, an objective lens 29 having a pupil 28, a mask 30 and a wafer 25. Although the arrangement shown in FIG. 7 is based on the contact printing method or proximity method by which the image of the mask is transferred to the wafer, this arrangement may be replaced by another arrangement based on the projection imaging method utilizing lenses and mirrors in which an imaging optical system is disposed between the mask and wafer. In the projection imaging method, if the image is telecentric, the wafer 25 of FIG. 7 may be considered to be the image of the wafer. In the scanning optical system shown in FIG. 7, the imaging relationship for a scanning spot is as follows: On the way from the scanned position 12 to the rotary polygonal mirror 14, the spot is once imaged on a position near the field lens 27 through the objective lens 29 and the relay lens 19 and then imaged at a position 34 again through the relay lens 15 after it has been reflected by the rotary polygonal mirror 14. Briefly, the positions 34, 27 and 12 are conjugate with one another.

In addition to the above important conjugate relationship of the scanning beam on the surface of an actual object as described above, the imaging relationship of the pupil in the optical system shown in FIG. 7 also is very important.

Although the pupil of the objective lens 29 is denoted by numeral 28 in FIG. 7, a point 35 on the optical axis which is the central point of the pupil 28 is conjugate with the reflection point 39 of the rotary polygonal mirror 14. From the view of the laser beam incident on the objective lens, the arrangement of FIG. 7 is equivalent to one which includes a rotary polygonal mirror 14 located at the pupil 28.

In addition, the present invention provides an imaging relationship between the exit end 7 of the laser system 1 and a point 44 on the entrance 40 of the optical system which is the pupil plane of the scanning optical system. This point 44 also is placed at an imaging relationship with the reflection point 39 of the rotary polygonal mirror through the condenser lens 13 and at an imaging relationship with a light blocking plate 46 spaced apart from a photo-detector 45. In this manner, it is possible to detect the dark field photoelectrically in the detecting section of the scanning optical system even if the emitting angle is changed under the change of the laser due to the vibration or the passage of time.

The diffraction light passed through the light blocking plate 46 is condensed on the photo-detector 45 through a condenser lens 47 whereat the diffraction light is photoelectrically converted into signals. At this time, the light blocking plate 46 is not necessarily placed in the imaging relationship with the photo-detector 45 as far as the light can be condensed on the photo-detector 45 under the change of the emitting angle within a predetermined range.

Thus, the amount of light at the spot striking the alignment marks upon aligning the wafer and mask 25, 30 with each other can be maintained minimum by using the optical system according to the present invention as an intermediate optical system in the semiconductor producing apparatus. As a result, the amount of light in the reflected beam is sufficient to effect the photoelectric detection with higher accuracy so that the accuracy in the alignment of the wafer and mask 25, 30 will be improved.

Furthermore, the object of the present invention can effectively be accomplished by placing the exit end 7 of the laser system 1 at the imaging relationship with the pupil plane of the scanning optical system in the central position of a range through which the scanning optical system is wholly moved along the optical axis to change the distance between the scanning optical system and the laser system 1.

As seen from the foregoing, the present invention provides an advantage by which the laser beam can be condensed under any external disturbance such as vibration, change of the laser emitting angle with the passage of time by the use of the afocal converter which places the laser exit end and the pupil (pin hole) of the optical system in an optically conjugate relationship relative to each other. Further, the degree of freedom may be increased with respect to the position at which the laser system is to be set.

While the invention has been described with reference to the structures disclosed herein, it is not confined to the details set forth and this application is intended to cover such modifications or changes as may come within the purposes of the improvements or the scope of the following claims.

What is claimed is:

1. An optical apparatus, comprising:
    means having an exit end, for emitting a laser beam from said exit end;
    means for forming a pupil;
    means for converging, into a spot, the laser beam emitted from said exit end of said emitting means and introduced through said pupil formed by said pupil forming means; and
    means for forming an image of said exit end of said emitting means substantially on said pupil formed by said pupil forming means, wherein said image forming means includes a first lens component having a forward focus and a rearward focus and a second lens component having a forward focus and a rearward focus, and wherein said forward focus of said first lens component is coincident with said exit end of said emitting means, said rearward focus of said first lens component is coincident with said forward focus of said second lens component, and said rearward focus of said second lens component is coincident with said pupil formed by said pupil forming means, said image forming means further including a third lens component disposed substantially at a point at which said rearward focus of said first lens component and said forward focus of said second lens component coincide with each other.

2. An apparatus according to claim 1, wherein said first and second lens components have the same focal length.

3. An apparatus according to claim 1, wherein each of said first and second lens components has a positive power and wherein said third lens component has a negative power.

4. An apparatus according to claim 1, wherein said third lens component has a variable focal length.

5. An optical apparatus, comprising:
    means having an exit end, for emitting a laser beam from said exit end;
    means for forming a pupil;
    means for converging, onto a member, the laser beam emitted from said exit end and introduced through said pupil formed by said pupil forming means;
    means for forming an image of said exit end of said emitting means substantially on said pupil formed by said pupil forming means, wherein said image forming means includes a first lens component having a forward focus and a rearward focus and a second lens component having a forward focus and a rearward focus, and wherein said forward focus of said first lens component is coincident with said exit end of said emitting means, said rearward focus of said first lens component is coincident with said forward focus of said second lens component, and said rearward focus of said second lens component is coincident with said pupil formed by said pupil forming means, said image forming means further including a third lens component disposed substantially at a point at which said rearward focus of said first lens component and said forward focus of said second lens component coincide with each other; and
    means for sensing the laser beam diffracted by the member to detect the position of the member.

6. An optical apparatus, comprising:
    means having an exit end, for emitting a laser beam from said exit end;
    means for forming a pupil;
    means for converging, into a spot, the laser beam emitted from said exit end of said emitting means and introduced through said pupil formed by said pupil forming means; and means for forming an image of said exit end of said emitting means substantially on said pupil formed by said pupil forming means, said image forming means including a first afocal system, which is subjected to a vibration, the vibration being the same as a vibration of said emitting means and a second afocal system, which is subjected to a vibration, the vibration being the same as a vibration of said converging means, said first and second afocal systems being disposed in the order named from the exit end of said emitting means.

7. An apparatus according to claim 6, wherein said first afocal system has a magnification smaller than 1 and wherein said second afocal system has a magnification larger than 1.

8. An apparatus according to claim 7, wherein the magnification of said first afocal system is a reciprocal of the magnification of said second afocal system.

* * * * *